(12) United States Patent
Deegan et al.

(10) Patent No.: US 8,404,919 B2
(45) Date of Patent: Mar. 26, 2013

(54) TREATMENT OF NUCLEAR SLUDGE

(75) Inventors: David Deegan, Bampton (GB); Chris Chapman, Fairford (GB); Saeed Ismail, Swindon (GB)

(73) Assignee: Tetronics (International) Limited, Swindon, Wiltshire (GB)

( * ) Notice: Subject to any disclaimer, the term of this patent is extended or adjusted under 35 U.S.C. 154(b) by 796 days.

(21) Appl. No.: 12/522,085

(22) PCT Filed: Sep. 19, 2007

(86) PCT No.: PCT/GB2007/003538
§ 371 (c)(1),
(2), (4) Date: Nov. 18, 2009

(87) PCT Pub. No.: WO2008/081155
PCT Pub. Date: Jul. 10, 2008

(65) Prior Publication Data
US 2010/0069698 A1    Mar. 18, 2010

(30) Foreign Application Priority Data

Jan. 5, 2007  (GB) .................................. 0700205.8
May 1, 2007  (GB) .................................. 0708452.8

(51) Int. Cl.
*G21F 9/20*    (2006.01)

(52) U.S. Cl. ........................................ 588/20; 588/410

(58) Field of Classification Search ................... 588/311, 588/301, 410, 412, 15, 16, 20, 252, 253, 588/256, 259, 261
See application file for complete search history.

(56) References Cited

U.S. PATENT DOCUMENTS

| | | | |
|---|---|---|---|
| 5,548,611 A | 8/1996 | Cusick et al. | |
| 5,573,564 A | 11/1996 | Richards | |
| 5,606,925 A | 3/1997 | Boen et al. | |

FOREIGN PATENT DOCUMENTS

| | | | |
|---|---|---|---|
| FR | 2291583 A1 | 6/1976 | |
| GB | 2218256 A | 11/1989 | |

OTHER PUBLICATIONS

International Search Report, PCT/GB2007/003538, Dec. 6, 2007, 3 pages.
Written Opinion, PCT/GB2007/003538, Dec. 6, 2007, 5 pages.
Abstract of WO9504004; 1995-Feb. 2009.
Bickford et al., "Vitrification of Hazardous and Radioactive Wastes (U)", Ceramic Engineering and Science Proceedings, Columbus, U.S., vol. 16, No. 2, 1995, 19 pages <http://www.osti.gov/bridge/servlets/purl/10103194-Nabbqy/webviewable/10103194.pdf>.

*Primary Examiner* — Edward Johnson
(74) *Attorney, Agent, or Firm* — Senniger Powers LLP

(57) ABSTRACT

A method for treating nuclear sludge comprising subjecting the nuclear sludge to a plasma treatment in a plasma chamber to melt at least some of the inorganic components of the sludge, wherein the plasma chamber comprises a crucible having a cooled inner surface, this surface cooled sufficiently such that the inorganic components in contact with the inner surface are in a solid state and form a barrier between the part of surface of the crucible with which they are in contact and the molten inorganic components of the sludge.

16 Claims, 4 Drawing Sheets

TREATMENT OF NUCLEAR SLUDGE

REFERENCE TO RELATED APPLICATIONS

This application claims priority to applications GB 0700205.8 filed Jan. 5, 2007 and GB 0708452.8 filed May 1, 2007, the entire disclosures of which are expressly incorporated herein by reference The present invention relates to a method of treating radioactive sludge, commonly termed nuclear sludge, a form of wet intermediate level waste (ILW).

Since the operation of the first nuclear power plants, there has been a need to safely dispose of waste that contains radioactive materials. Radioactive waste materials which need to be disposed of may also be produced in other industrial environments, such as hospitals, research establishments, decommissioning of nuclear power stations and in industry. The waste materials can arise from operational sources, e.g. during the process of spent fuel management, or during decommissioning activities. Fractions of such waste are typically found to be in a sludge form, due to the use of water as a moderator, shielding medium and as a thermal management tool, that contains both corrosion by-products and/or functional filtration media. A sludge may be defined as a liquid containing solid particles, at least some of which are radioactive for this class of waste.

As part of the high profile nuclear clean up occurring in the UK there are requirements for facilities to condition radioactive Intermediate Level Waste (ILW) (which may be in the form of Magnox sludges, spent ion exchange media (natural or synthetic), organic ion exchange media, effluent management residues and sand) into a stable solid product suitable for interim, and ultimately, long term storage/disposal. These sludges are typically classified as intermediate level waste (ILW) because of their decay mode specific activity levels and their radiogenic heat characteristics, and, in the form in which they found, i.e. in bulk storage tanks and storage ponds, they are often thick mineral suspensions of approximately 50% v/v solids concentration of varying character.

Recent developments for disposing of hazardous wastes include in-drum pyrolysis processes, such as that disclosed in the patent publication WO 2004/036117. This document discloses a process that involves pyrolysis and then steam reforming of waste containing organic materials and radionuclides, i.e. radioactive materials. The pyrolysis process volatises the organic materials within the drums at a temperature of between 200° C.-800° C. The resulting solid material remaining in the drums after the pyrolysis as a dry, inert inorganic matrix, which contains the radionuclides and their compounds. This inert inorganic matrix has a high carbon content, indicating the reactive form of the residues and the ineffectiveness of the thermal treatment. The remaining species in the gaseous phase following pyrolysis are water vapour, volatised organics and acid gases, which then are fed to a steam reformer, which operates at a temperature of 800° C. to 1000° C. This process is only of use for waste that is contained in drums and can only be carried out as a batch-wise operation. The drum material provides a barrier between a user handling the waste and the radioactive materials contained within the solid product material in the drum. However, it is not convenient to treat all waste in drums. Additionally, the present inventors have found that the final solid product produced with the in-drum process does not form a satisfactory physical and chemical barrier to the escape of radionuclides contained within the solid product as it takes the form of a clinker (particles fused at the edges), as opposed to a dense slag. This means that the hazardous components of the waste could potentially be remobilised physically.

In the proceedings of GLOBAL 2005, held at Tsukuba, Japan, on Oct. 9-13, 2005, (gaper No. 016) a process for treating low and intermediate level nuclear waste in an incinerator and melting furnace was disclosed. The process involved the incineration of the waste in a plasma furnace that had a centrifuge chamber. When the waste was loaded into the plasma furnace, the centrifuge would force the waste to the sides of the rotating walls of the chamber. On initiating the plasma furnace, the waste melts and when the rotational velocity decreases the liquid waste runs towards the centre of the furnace floor and exits the chamber through an outlet in the floor into a mould beneath the outlet. The design of the chamber is complex and difficult to service, which presents health and safety risks as the refractory forms a large mass of contaminated secondary waste, which needs to be periodically replaced involving significant levels of direct physical handling. The process also results in a large amount of offgas containing many contaminants, due to the use of an auxillary gas burner, which must be treated in a separate part of the apparatus. The offgas treatment is an expensive and energy-consuming process.

The most commonly used method of processing nuclear sludge is by cement or grouting techniques. These techniques have been used in the UK by the British Nuclear Group at the Trawsfynydd amongst other sites. The technique involves encapsulating nuclear waste with a cement-like material. If the nuclear waste is in liquid form, i.e. a sludge containing a sufficient amount of free water, dry cement powder can be added to the liquid, which will then set around the waste. The waste can be first placed in packages and then encapsulated in the cement to allow transportation of the waste. If the waste does not contain sufficient water for the grout to set, pre-prepared liquid cement can be poured onto the waste and allowed to set. These processes have the disadvantage that the resultant cement-encapsulated waste takes up considerably more volume than the original waste: typically, the original waste may constitute 25% or less of the volume of the final product and the active storage of waste is very expensive.

It is an aim of the present invention to overcome or mitigate the problems associated with the prior art.

The present invention provides a method for treating nuclear sludge comprising:

subjecting the nuclear sludge to a plasma treatment in a plasma chamber to melt at least some of the inorganic components of the sludge, wherein the plasma chamber comprises a crucible having a cooled inner surface, this surface cooled sufficiently such that the inorganic components in contact with the inner surface are in a solid state and form a barrier between the part of surface of the crucible with which they are in contact and the molten inorganic components of the sludge.

The present invention will be illustrated with reference to the accompanying drawings, in which.

Figure 2:
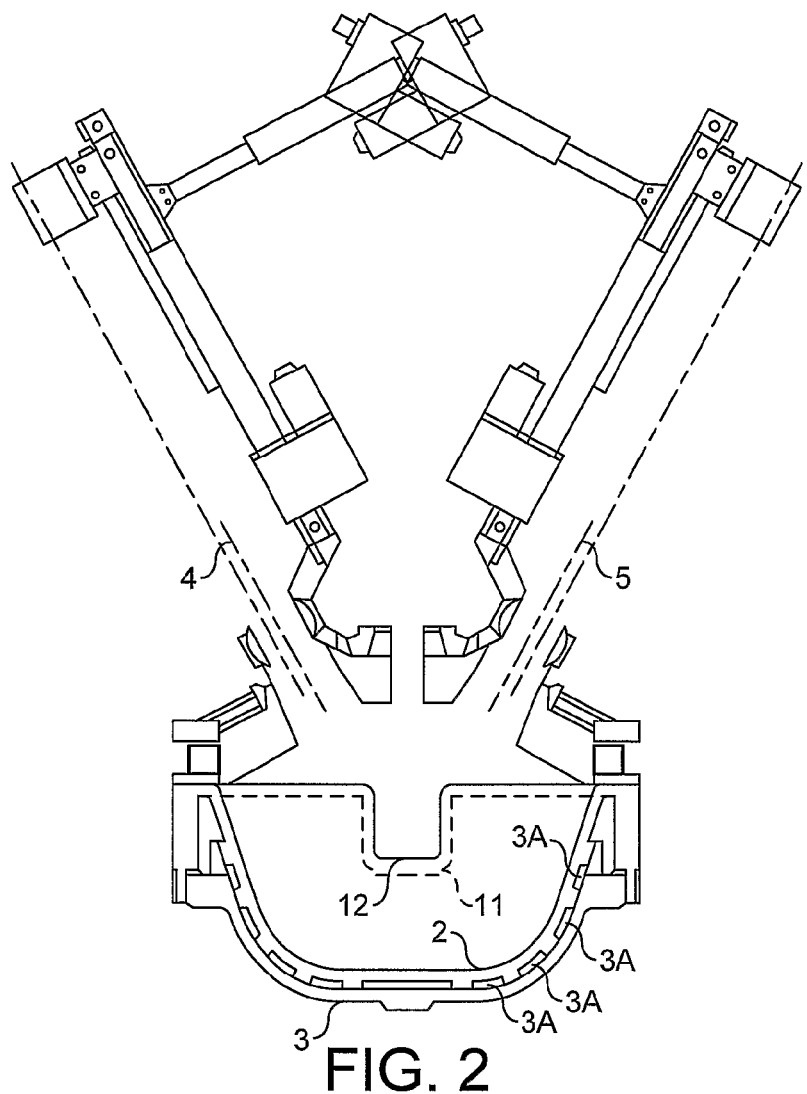
FIG. 2 shows a plasma chamber for use in the method of the present invention, including a crucible, the roof and two plasma device manipulators ("vertical actuators" in diagram) for both vertical and angular manipulation.
Figure 3:
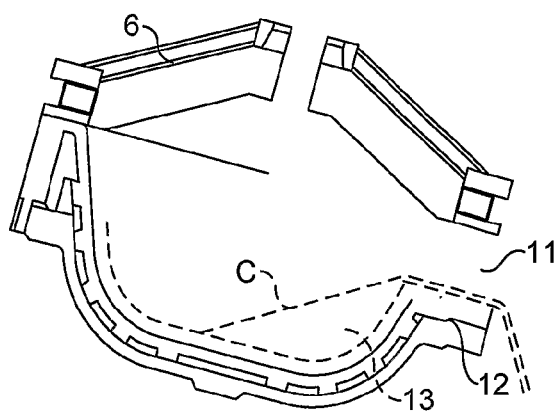
Figure 4:
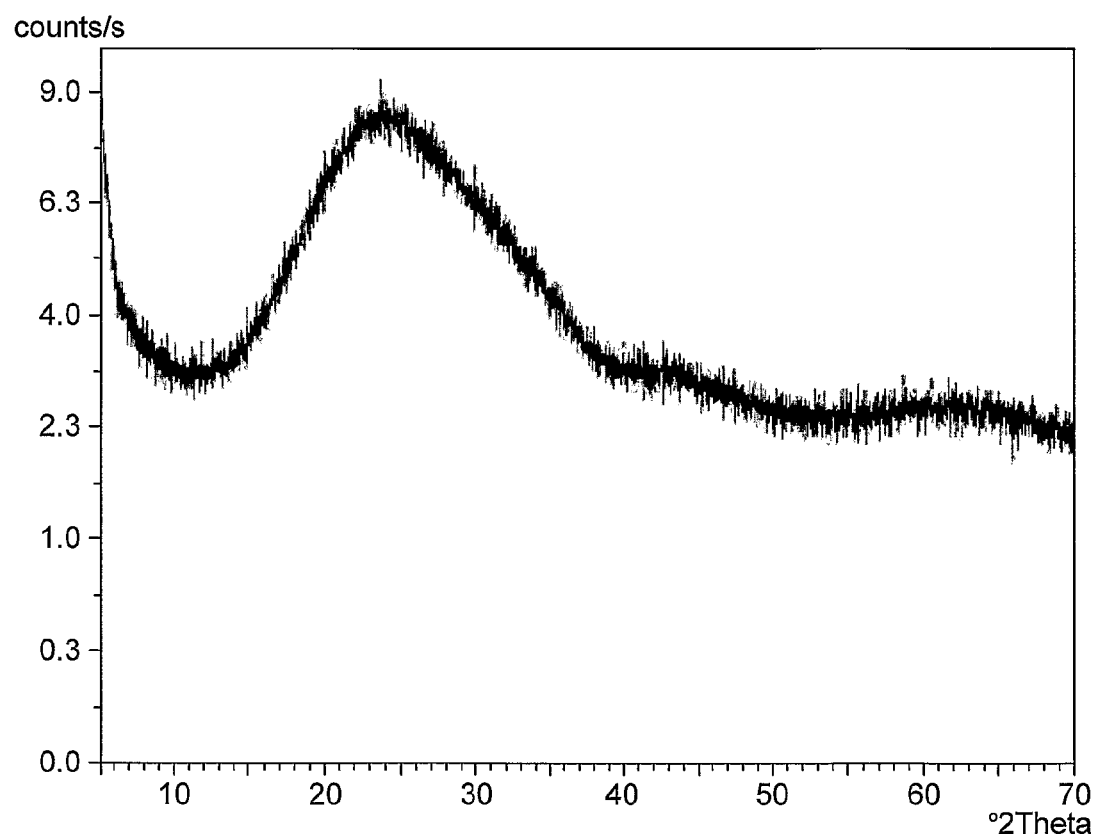
Figure 5:
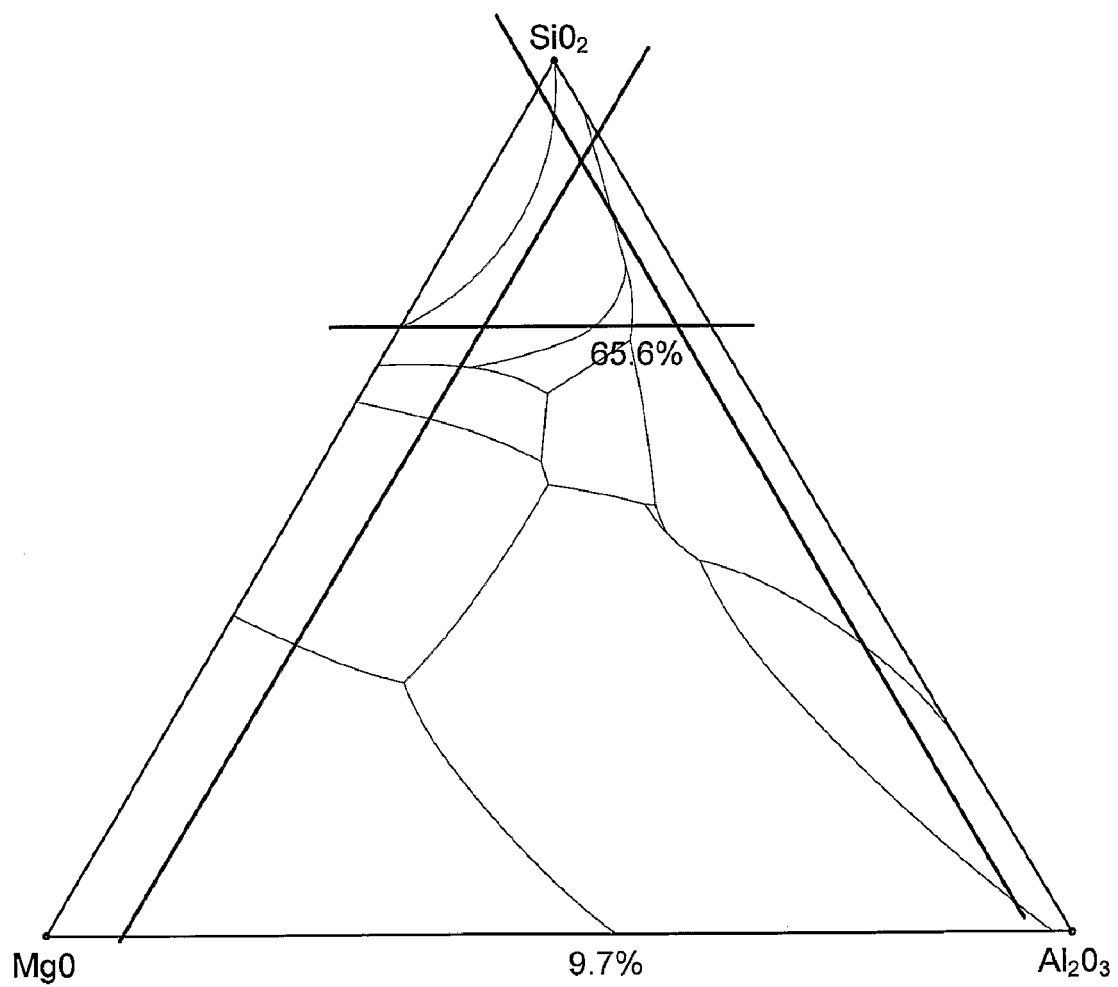

FIG. 3 shows a cross section of the crucible and roof along the dotted line shown in FIG. 2, with molten final waste form material (oxidised radioactive waste in a combined glassy form) inside the crucible flowing out of its exit with an intact skull. A plenum device (not shown) is used to control and distribute the admittance of compressed air, which permits mixing of the oxidant with the solid waste;

FIG. 4 shows an X-ray diffraction pattern of the final waste form of Sludge #4 from the Examples; and FIG. 5 shows the three-component phase diagram for Sludge #4, with target phase boundaries defined by alumina, silica and magnesia analysis.

The present inventors have found that the inorganic components of the sludge, within the plasma furnace, form a vitreous liquid with a high radionuclide incorporation rate. This mass of waste accumulates as the process progresses until a predefined volume of vitreous product has been generated. At this point the material is transferred to an outer packaging container; where it is allowed to solidify as a monolith in line with regulatory requirements.

The present inventors have surprisingly found that treating nuclear sludge within a plasma chamber has a number of advantages over the prior art. In contrast to the techniques of encapsulating nuclear waste in cement, the method of the present invention reduces the volume of the nuclear sludge and the end product is a solid, dense, vitrified material in which the radioactive nuclides are contained—the radionuclides have been found to be physically and chemically immobilised in the resultant solid waste material. Little, if any, leaching has been found to occur from the solid materials, which has been quantitatively determined to out perform traditional high-level waste borosilicate type glasses for silicon release under both neutral and alkaline conditions.

By using a crucible with a cooled inner surface, a layer of solid, inorganic material has been found to develop on this surface from the waste material itself. Since this protects the material of the crucible and is effectively self-replacing on treating more radioactive sludge, the lining of the crucible does not need to be replaced. It also avoids the build-up of radioactive nuclides within the crucible walls or their lining, as its section can be varied and replaced through control of heat flux density, therefore preventing critical levels of nuclides occurring in the apparatus. The present inventors have found, for example, that the refractory linings traditionally used in the field are unsuitable for use in treating nuclear waste. The refractory linings are corroded by the corrosive chemical components typically present in the sludges, e.g. NaOH used in the management of wastes in ponds. Additionally, nuclides tend to build up in the refractory material, which may lead to critical levels of radioactive material and ultimately the production of a high level waste. A further advantage of the method of the present invention is that it does not require the presence of a host slag material, i.e. the radioactive sludge is converted to a solid form in the plasma chamber without the need for much, if any, additional uncontaminated solid material, blending agents.

A "sludge" is a well known term in the art of processing radioactive material and generally refers to a liquid containing solid particles, at least some of which are radioactive. The sludges can have wide and varied rheological properties. The sludge can generally flow and the particles may be present as a suspension in the liquid or as a separate settled phase.

The sludge may contain one or more materials including, but not limited to, magnesium, potassium, silicon, uranium, aluminium and sodium in elemental, oxide, hydroxide and/or carbonate form. The final product, i.e. wasteform, has been found to be vitreous and generally amorphous, but may contained mineralogical phases such as forsterite, cordierite, albite, clinoptilolite and other zeolites. The phases present in the final wasteform are dependent on both thermal history and wasteform composition, as shown in the Examples.

The method may further involve oxidising the inorganic components of the waste by introducing an oxidant to the plasma chamber.

The nuclear sludges that may be treated include, but are not limited to:
 a magnox sludge from ion exchange facilities, which may contain predominantly magnesium hydroxide.
 a sand/clino sludge from ion exchange facilities, which may predominantly contain clinoptilolite or an equivalent zeolite.
 a magnox legacy pond sludge, which may comprise one or more of the following: magnesium hydroxide, uranium oxides, magnesium carbonate and other minor constituents.

The method of the present invention preferably includes the further step of removing the molten inorganic components derived from the sludge from the plasma chamber and allowing them to cool to form a vitrified solid material.

Preferably, the one or more electrodes comprise graphite. Such electrodes have been surprisingly found to be particularly durable when used in the method of the present invention and resistant to corrosive chemicals such as halogens and highly alkali environments. Preferably the electrodes are coated with alumina, which will give more consistent wear characteristics and minimise lateral electrode carbon losses.

The plasma chamber may comprise one or two plasma torches and/or electrodes. Preferably, the plasma chamber comprises two graphite electrodes, preferably operable in two modes.

Preferably, the method involves maintaining at least some of the inorganic components in a molten state by directly coupling the arc from the graphite electrodes to the molten inorganic components. This is often termed a transferred arc mode.

The electrodes may be operated in a first mode in which an electric arc is passed between the electrodes above the level of the nuclear sludge. This is preferably used to initiate the formation of the plasma in the process. The first mode allows the plasma process to be initiated easily and avoids the need for a conductive hearth which allows for flexibility in operation. If the plasma chamber comprises a single plasma electrode, the crucible may act as a live component of system.

The plasma electrodes may be operated in a second mode in which an electric arc is passed between the torches through the sludge. This is preferably used to maintain the inorganic components of the sludge in a molten state once the plasma has formed, as the zone of influence of the process heat is extended. The second mode allows ohmic heating of the inorganic components of the sludge. This means that the electrical current passes through the material undergoing treatment and therefore provides for a higher power input per unit current that is spatially distributed, i.e. two arc attachment points, with a high coupling efficiency between the plasma and waste.

Preferably, the plasma is generated using DC electricity.

The inner surface of the crucible preferably comprises copper. Copper has been found to be particularly suitable because it is robust, thermally and electrically conductive inhibiting both chemical and thermal erosion processes, ductile and therefore tolerant of thermal cycling, dense with high thermal mass and therefore ensure safe containment.

As is known to one skilled in the art, a plasma chamber comprises a crucible for holding the material to be treated, in this case the radioactive sludge. "Crucible" means a container suitable for use in a plasma chamber. The crucible used in the present invention has a cooled internal wall. Preferably, the crucible has a cooling system for maintaining the internal wall of the crucible at a temperature below 100° C., preferably below 50° C., irrespective of pressure, to avoid water film boiling and maintain good heat transfer. Preferably, the cooling system is a water-cooling system, wherein preferably water is passed between an outer wall and an inner wall of the crucible in order to cool the inner wall. The crucible containment device can also be refractory lined with indirect water-cooling, i.e. remote water-cooling to the process with conductive heat transfer into the working environment to provide for the desired temperature profile.

Preferably, during the method of the present invention, the inner wall of the crucible is maintained below the liquidus, more preferably the solidus, temperature of the inorganic components of the sludge. (The liquidus and solidus temperatures of the inorganic components are readily measured by one skilled in the art by routine experimentation.) Preferably, the inner wall of the crucible is maintained at 100° C. or below, preferably 50° C. or below.

Preferably, the process further comprises transferring the molten components of the sludge to a container for the storage of nuclear waste.

Preferably, the plasma treatment is carried out at a temperature of 1000° C. or above, more preferably 1200° C. or above. In other words, the temperature of the plasma within the chamber is 1000° C. or above. Preferably, the plasma treatment is carried out at a maximum temperature of 1800° C., more preferably a maximum of 1600° C. More preferably, the plasma treatment is carried out at a temperature of from 1200 to 1500° C., most preferably at a temperature of about 1350° C.

An oxidant may be present within the plasma chamber. The oxidant preferably comprises oxygen. The oxidant may comprise air, oxygen gas and/or steam.

Preferably the oxidant comprises air. Air has been found to be particularly suitable and safe for use in the present invention.

Any plasma gas known to the skilled person may be used in the method of the present invention, including, but not limited to, argon and nitrogen. Most preferably, argon is fed to the plasma chamber as a plasma gas.

The plasma treatment is preferably carried out at a temperature at or above the liquidus temperature of the particles in the sludge, i.e. the inorganic components of the sludge.

Additional material may be added to the sludge as required. Preferably, at least some of the particles within the sludge have a liquidus temperature of 1600° C. or below, more preferably 1500° C. or below, most preferably 1400° C. or below, and additional material may be added to ensure that the liquidus temperature of the particles is in the preferred range. For example, if the sludge contains one or more of $Na_2O$, $Al_2O_3$ and $SiO_2$, further amounts of one or more of these materials may be added to the sludge before or during plasma treatment to ensure that the relative ratios of the material are such that the material can form an albite material ($Na_2O$—$Al_2O_3$-$6SiO_2$).

Alternatively, if the sludge contains magnesium species (for example magnesium oxides or hydroxides), $Al_2O_3$ and/or $SiO_2$, then further amounts of one or more of these materials may be added to the sludge before or during plasma treatment to ensure that the relative ratios of the material are such that the material can form a forsterite and/or cordierite material ($MgO$-$2Al_2O_3$-$5SiO_2$/$2MgO$—$SiO_2$). Forsterite/cordierite materials have been found to have a liquidus temperature within the preferred range and also have a suitable viscosity when molten under plasma conditions.

The method may further comprise carrying out the plasma treatment of the radioactive waste material in a receptacle removable from the plasma unit and that can be sealed following the plasma treatment, allowing the waste to be disposed of within the receptacle. A new receptacle can then be placed in the plasma unit and the process repeated. This avoids the need to transfer the molten and/or vitrified radioactive material following plasma treatment from the plasma unit (e.g. from a crucible) to a separate receptacle (e.g. a drum for the disposal of radioactive waste). The receptacle may, for example, be a receptacle having an inner surface lined with refractory or other material suitable for withstanding the conditions to which it would be exposed during plasma treatment. The receptacle may be in the form of a drum for the disposal of radioactive waste.

The present invention further provides use of an apparatus for the treatment of nuclear sludge.

The plasma chamber may comprise one or more inlets for an oxidant, e.g. an oxidising gas. The inlet for oxidant may be arranged such that the oxidant enters the plasma chamber through the sludge.

Preferably, the apparatus is adapted such that the plasma power input and/or oxidant supply are controlled using automated control loops, rather than being set at predetermined levels throughout the treatment process.

The plasma chamber will include a plasma gas, such as argon. Other gases that may be present in the plasma chamber include nitrogen, steam, and gases produced from the treatment of the waste, such as carbon monoxide and/or carbon dioxide. Nitrogen may be present from the inlet of air, which may be used to cool the gas stream, if required.

Preferably, the plasma chamber is maintained at a power consumption rate of from 150 to 350 kW.

Preferably, the plasma chamber comprises monitoring equipment, including, but not limited to equipment selected from: CCTV monitoring equipment for viewing the molten material within the plasma chamber, equipment for monitoring the amount of waste material and/or host slag material being fed to the plasma chamber, equipment for monitoring the internal temperature of the plasma chamber and equipment for monitoring the internal pressure of the plasma chamber.

The apparatus may be operable using a sealed gravity feed mechanism. The apparatus may comprise a working upper chamber and a lower receptor chamber, wherein the upper chamber is adapted such that the molten slag material in the upper chamber can flow by gravity into the lower chamber. This is particularly advantageous in a continuous process, in which the blended waste is fed into the chamber continuously or periodically and avoids the requirement to run the process in a batch-wise manner. The upper and lower chambers are preferably sealed to prevent ingress of diatomic species into the plasma chamber from its exterior and egress of hazardous species. The nuclear sludge may be fed to the plasma chamber through an airlock device, which ensures positive displacement of the waste into the unit, and prevents ingress or egress of gases and heat to/from the interior of the plasma chamber. Feed ports containing airlock devices are known to the skilled person. The product material in the lower chamber can be removed after solidification.

The present invention will now be illustrated with the following non-limiting Example.

EXAMPLE

The Plasma Chamber

Figure 1A:
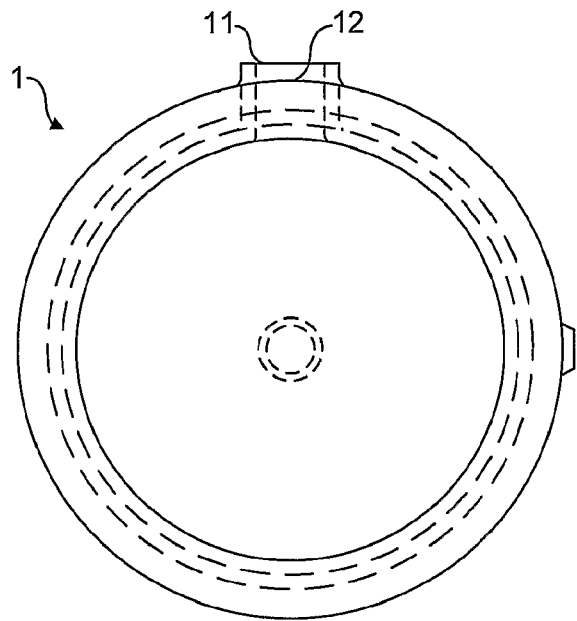
FIGS. 1a-1c show a crucible suitable for use in the method of the present invention, with 1a showing a plan view, 1b showing a cross section of the crucible, with cooling water channels shown between the inner and outer walls, and 1c showing a detail of the cross section in operation, i.e. with a cold skull in place.
Figure 1B:
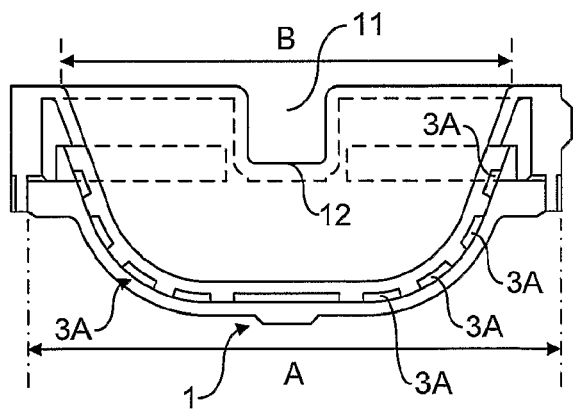
Figure 1C:
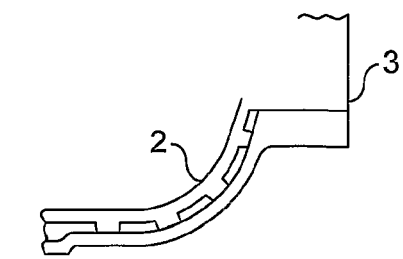

A plasma chamber was provided as shown in FIG. 2 having a crucible 1 as shown in FIGS. 1b, 1c and 3. The crucible 1 had an inner wall 2 and an outer wall 3, both formed from cast, high conductivity copper. Between the inner and outer walls 2,3 were water cooling channels 3A for cooling the inner surface of the crucible.

The plasma chamber further comprised one or more plasma torches/electrodes and more preferably two plasma torches/electrode, their longitudinal axis of location are shown at 4 and 5. The electrodes are manipulated using vertical and horizontal electromechanical actuation.

The crucible sections were joined to the roof 6 at a flange. The crucible was lowered and removed using an electrically actuated jacked platform, for servicing away from the main furnace frame. The water-cooled, conical furnace roof 6 was lined with high-grade dense alumina refractory and fixed within the furnace-supporting framework.

Within the plasma chamber was located a single plenum device (not shown) having an oxidant inlet. The device further comprised a jacket having an inlet and an outlet for water for cooling the device. The inlet and outlets were both connected to the inner water cooling circuit. The plenum device allows for distribution of oxidant within the plasma chamber and also allows good oxidant-feed contact, i.e. contact of the waste with the oxidant.

The roof 6 contained the following ports: two ports for electrodes, one dual oxidant introduction port, one feeder discharge port, one temperature monitoring probe port and an exhaust mounted sight port with CCTV.

FIG. 2 gives a general assembly drawing of the plasma chamber with the graphite electrodes and actuators in place.

The crucible had an exit 11 at one side with a lip 12 extending downwards therefrom. A lower chamber (not shown) is positioned below the exit 11, such that molten material 13 during the reaction can flow by gravity out of the exit 11, down the lip 12 and into the lower chamber.

The Off-Gas System

The off-gas handling system comprised a refractory lined combustion chamber reactor off-gas duct extension of mild steel construction with temperature and pressure instrumentation. The system pressure and overall gas flow rates were controlled using an inverter drive induced draft (ID) fan.

The particulate within the off-gas stream was removed using a reverse-jet-pulse baghouse, rated for a maximum gas flow rate of 6000 $Am^3\ hr^{-1}$ at a temperature of up to 220° C. which was backed with a secondary panel HEPA filter to its baghouse to act as a fail-safe mechanism, in case of primary filter failure. Emissions data were recorded by a professional stack monitoring company in line with the Monitoring Certification Scheme (MCerts) and The United Kingdom Accreditation Service (UKAS) accreditation and certification. The exhaust gas composition was monitored by Envirodat Limited, using a Fourier Transform Infrared (FTIR) Spectroscopy gas analyser supplied by Quantitech Ltd.

Using the Apparatus

Because of the dangerous nature of radioactive materials, the method of the present invention was demonstrated using non-radioactive materials that were very similar in chemical and physical properties to radioactive waste from certain sources.

Sludge #4 and its Simulant

This is a sand/clino arising from an ion exchange facility (Sludge #4) sludge that is predominantly clinoptilolite with low levels of sand and other minor constituents.

The chemical specification of the radioactive sludge and the associated simulant specification are given in Table 1. The trace radioactive species were dosed on top of the bulk chemistry of the sludge in the following proportions $Sr^{90}$=0.35 $mg/m^3$ settled sludge $Cs^{137}$=5.18 $mg/m^3$. Plutonium was not simulated with cerium as the amount used to simulate uranium would dominant any sensible retention assessment.

TABLE 1

Sludge #4 Simulant Chemical Specification

| Radioactive Sludge Bulk Chemistry | | Simulant Sludge Bulk Chemistry | |
| --- | --- | --- | --- |
| Liquid Phase | % w/w | Liquid Phase | % w/w |
| $H_2O$ | 27.86 | $H_2O$ | 33.21 |
| NaOH | 9.14 | NaOH | 10.90 |
| $C_6H_{12}O_6$ (dextrose) | — | sawdust | — |
| Solid Phase | % w/w | Solid Phase | % w/w |
| $SiO_2$ | 7.5 | $SiO_2$ | 7.02 |
| $Mg(OH)_2$ | — | $Mg(OH)_2$ | 4.97 |
| $Al_2SiO_5$ | — | BNG Clino | 43.89 |

In all cases the simulants were prepared by mixing the dry powder components together, followed by manual rotary blending to form a homogeneous mixture. The sodium hydroxide and water were mixed independently to form a solution; this was exothermic and so occurred well in advance of the material being charged to the plasma furnace to allow for the dissipation of heat. The only material that was not sourced through certified industrial and/or laboratory channels was the cellulose or dextrose representing the organic fraction. (Dextrose was used as a convenient representative for the organic fraction of the sludge in the thermochemical simulation.) This was simulated using sawdust sourced locally and was representative of the organic debris within the magnesium hydroxide rich sludges.

Experimental Plan

The process design criteria were determined using thermodynamic calculations based on the simulated chemistry of the ILW sludges combined with an understanding of the temperatures required for effective thermal treatment, as defined by phase stability and liquidus temperatures (phase diagrams), to produce a vitrified product. The thermodynamic code marketed by Outokumpu Research, called HSC Chemistry®. Version 5.1 was employed to model the system chemistry.

Sludge #4 (Trials 1 & 2)

A simulant was prepared in accordance with the Section entitled "Sludge #4 and its Simulant". Enough material was blended to provide for approximately 100 kg of vitrified final waste-form. To the above 50 cc of $CsNO_3$ as 1000 ppm solution equal to 50 mg Cs and 50 cc of $Sr(NO_3)_2$ 1000 mg/liter solution equal to 50 mg Sr.

The trial was started by adding 50 kg of simulant without the aqueous solution component to the hearth (the plasma chamber). This was vitrified while adding 20.595 kg solution (14.6 liters per hour for 1 hr 24 minutes) to make up the balance of the simulant. This arose due to the unforeseen reaction of dry sodium hydroxide with the balance of the simulant, i.e. the water contained within the clinoptilolite (≈14% w/w) reacted with the dry sodium hydroxide to form a cement. When steady state high temperature plasma conditions were reached with the mass of molten vitrified product in the furnace, feeding commenced under the following conditions:

Gross Plasma Power=150 kW
Assumed Steady State Losses=100 kW
Solid Feed Rate=29.62 kg/hr
Liquid Feed Rate=20.37 kg/hr (Water and NaOH)
Duration=1 hour 24 minutes.
Operating temperature=1600° C.

Sludge #4 did not need any blend material addition as it automatically falls into the albite phase region ($Na_2O$—$Al_2O_3$-$6SiO_2$) of the $Na_2O$—$Al_2O_3$-$6SiO_2$ phase diagram. The vitrified material was anticipated to have a liquidus temperature of approximately 1100° C. The vitrified product was also predicted to have a low viscosity due to the presence of a large amount of soda ($Na_2O$), to act as a silicate network modifier and disrupt the tetrahedral silica structure. The vitrified product is predicted to have a theoretical density of 2620 kg/m$^3$.

Mineralogical Information: albite
Chemistry: $NaAlSi_3O_8$, sodium aluminium silicate.
Class: Silicates
Subclass: Tectosilicates
Group: Feldspars
Uses: ornamental stone, ceramics and mineral specimens.
Sludge #4
Operational Results The simulant material was treated and vitrified. The simulant material of Sludge #4 was charged to the furnace as two separate streams: a liquid stream containing trace dopants of Cs and Sr using a positive displacement metering pump and the balance of the simulant, as a dry powder blend using a volumetric screw feeder. The two separate mechanisms were employed solely due to time limitations and the feeders available. The simulant material was charged and vitrified/oxidised in the cold crucible, twin electrode, plasma vitrification furnace using a twin graphite electrode system over a cold skull copper crucible. The furnace was pre-heated for approximately 20 minutes, using the plasma arc at a typical operating power of around 120 kW prior to the feeding of the simulant. The simulant was fed into the furnace after full-scale deflection (FSD) calibration of the feeding system, i.e. dosing pump and volumetric screw feeder. The feeder discharged into a gas purged, water-cooled, vertical pipe leading to the roof of the furnace and exiting directly between the arcs. Argon was charged to the furnace using a port at the distil end of the feed tube. The sludge simulant was processed at a feed rate approaching 40 kghr$^{-1}$ (wet and dry components in combination) at an average operating gross input power of around 130-150 kW approximately 1 hours. The vitrified product residue within the furnace was allowed to solidify in-situ and was then sampled from the furnace mechanically.

The electrodes used in this test-work were 50 mm in diameter with an 8 mm diameter bore hole down the centre for plasma gas. The graphite electrodes were manufactured from HLM graphite, which is an extruded grade; superior isostatically pressed grades are available. These sections were 800 mm in length, with either female or male threads on the end and a gas fitting on the end, external to the furnace, for plasma gas connection.

No direct measurements of temperature were made, i.e. within the plasma furnace, however a physically shielded 'B' type thermocouple in the sidewall of the plasma chamber recorded temperatures in the region of 200° C. The system thermal losses are acquired from instrumentation on the water-cooling manifold lines and was calculated using the following equation:

$$Q_{loss}=K' \times F_R \times (T_{rtn}-T_{flw})$$

Where: $Q_{loss}$=Thermal loss (kW)
$F_R$=Water flow rate (l m$^{-1}$)
$T_{rtn}$=Return water temperature (° C.)
$T_{flw}$=Flow water temperature (° C.)
K'=0.07 (kW min liter$^{-1}$° C.$^{-1}$)
=Specific heat ($C_p$) of water corrected for volume and units As would be expected, the crucible loss dominated the thermal losses of the furnace, which were observed to have average values of 70-80 kW with vitrified sludge simulant. The total losses and power input were observed to balance after time indicating the system reached steady state.

Overall, 69.6 kg of vitrified final wasteform should have been produced from the sludge #4 simulant charged to the furnace by calculation. The recorded mass of final wasteform recovered from the furnace is 64.2 kg. There was a very high level of material retention within the furnace and the discrepancy is well within the limits of compound accuracy associated with the techniques employed.

Both the anode and cathode weighed 1660 g at the start of the test, the combined graphite wear rate was 2.87 kg MWh$^{-1}$. These values of electrode mass loss per MWh of input energy give a parameter that is normalised for the contribution of the erosion due to input energy; i.e. it allows the erosion of different industrial processes to be compared.

Both electrodes tended to wear to a conical shape as a result of erosion at the hot tip and lateral erosion due to oxidation. The cathode electrode also exhibited radial wear along its shaft exposing the channel. The wear rates were consistent with previous experimental data and compared favourably with the characteristics of other pyrometallurgical operations where wear rates can approach 15 kg MWh$^{-1}$. Typical wear rates observed in plasma furnace operation are $\leq$5 kg MWh$^1$, which suggests that there will be no fundamental problem in using graphite electrode systems for radioactive waste treatment on a larger scale. After the experiment the crucible was observed to be in good condition.

Sludge #4 Final Waste-form

The anticipated composition of the vitrified product/final waste form produced from sludge # 4 is shown in Table 2 below. The blended material charged to the plasma furnace consisted of 100% w/w sludge # 4 on a dry calcined based. Mass recovery of the oxide content of the fed simulant approached 100%.

TABLE 2

Anticipated Final Waste-form Composition of Thermally Treated Sludge #4

| Species | % w/w | Notes |
|---|---|---|
| $CeO_2$ | 0.00 | Approximate liquidus temperature = 1100° C. |
| MgO | 6.18 | |
| $Al_2O_3$ | 16.31 | Mineralogical basis from ternary phase |
| $SiO_2$ | 60.68 | diagram - resides within the albite |
| $Na_2O$ | 16.83 | phase field |
| Total | 100.00 | |

The density of the vitrified product was measured to be 2340 kg m$^{-3}$. The product had a green vitreous appearance. The X-ray diffraction pattern of the sludge #4 final wasteform and its phase diagram, derived from the chemical analysis, are presented in FIG. 4 and FIG. 5, respectively. This sludge contained 13.3% sodium oxide with the target phase albite, $Na_2O.Al_2O_3.6SiO_2$. The pattern shows that on rapid cooling it formed a soda-silica glass, instead of crystalline albite, with the other elements in solid solution, hence, complete reaction had occurred on processing. Information on the analysis techniques employed can be found below.

The actual and revised predicted final waste-form composition is presented within Table 3. Good agreement is observed between the predicted and actual analysis results. The symbol '<' indicates that the value lies below the limit of detection (LoD).

TABLE 3

Chemical analysis (% w/w) of the Final Waste-form of Sludge #4

| Vitrified product 4 | Actual Analysis | Prediction Waste-form Composition |
|---|---|---|
| $Na_2O$ | 13.34 | 14.24 |
| MgO | 5.40 | 6.10 |
| $Al_2O_3$ | 9.70 | 9.12 |
| $SiO_2$ | 65.61 | 67.71 |
| $P_2O_5$ | < | |
| $K_2O$ | 1.20 | 1.31 |
| CaO | 1.66 | 1.51 |
| $TiO_2$ | 0.13 | |
| $Mn_3O_4$ | < | |
| $V_2O_5$ | < | |
| $Cr_2O_3$ | < | |
| $Fe_2O_3$ | 0.82 | |
| $ZrO_2$ | < | |
| ZnO | < | |
| SrO | 0.26 | |
| BaO | 0.19 | |
| $La_2O_3$ | 0.09 | |
| $CeO_2$ | < | |
| Total | 98.40 | 100.00 |

The anticipated concentration of both Cs and Sr from the dopant addition made was 0.59 ppm in both cases. However, this value is below the LoD of the analysis techniques employed and therefore it was a surprise to find that the reported Cs concentration in the final waste-form was 89 ppm. Similarly following the analysis of the composition of clinoptilolite which was reported to contain 0.33% strontium, it was no surprise to find that the strontium concentration of the vitrified product was 0.26% w/w. Therefore, inactive strontium accountability will be of little use for any simulant experiment containing clinoptilolite. The analysis of the clinoptilolite is presented in Table 4.

TABLE 4

Clinoptilolite Analysis (% w/w)

| Clinoptilolite | Analysis |
|---|---|
| Na2O | 3.35 |
| MgO | 0.70 |
| Al2O3 | 12.44 |
| SiO2 | 73.06 |
| P2O5 | <0.05 |
| K2O | 1.79 |
| CaO | 2.06 |
| TiO2 | 0.15 |
| Mn3O4 | <0.05 |
| V2O5 | <0.05 |
| Cr2O3 | <0.05 |
| Fe2O3 | 0.96 |
| BaO | 0.22 |
| ZrO2 | <0.05 |
| ZnO | <0.05 |
| SrO | 0.33 |
| Water Content | 14.1 |

Technology Performance Assessment

The experiments above demonstrate the suitability of the method of the present invention for the treatment of ILW radioactive sludge wastes. The work has clearly demonstrated the robust and tolerant characteristic of the plasma technology with respect to the compositional envelopes of the sludges and their associated transfer profiles. In all cases, the results have shown close agreement with the experimental predictions, the final waste-form being of a dense and homogeneous character. The bulk chemical analyses of the final waste-forms showed good agreement with the predicted compositions, allowing for the heterogeneous nature of the simulant feed materials. The phase analysis showed that the feed materials were transformed to a homogeneous product, which in most cases was a glass and in one case was a glass-forsterite mixture. This supported the predicted phase compositions. The operational prototype test facility was reliable and its performance was predominantly in line with the developed thermodynamic models. In all cases good levels of accountability were observed for both the transuranic simulant components and for the other simulant ingredients. In combination the data confirm the viability of plasma technology of the application.

Material Analysis Techniques

Chemical analyses were performed by LSM (London & Scandinavian Metallurgical Co. Limited), a UKAS accredited laboratory. For the vitrified product samples, XRF was employed to obtain quantitative compositional data on the bulk oxides after sample fusion into a glass bead using lithium tetraborate.

Trace element analysis of caesium and strontium was carried out by inductively coupled plasma optical emission spectroscopy (ICP-OES).

In addition, X-Ray diffraction (XRD) was used to evaluate the phases present in the final wasteform samples.

Specific Gravity (SG) by Water Displacement

SG—This is based on water displacement (immersion), however as the weights of samples become smaller, the water displacement methodology becomes less accurate. The test is reasonably simple to perform, but is only suitable for monolithic samples and not powder samples. A sample is weighed dry and then submerged in distilled water; the volume of water displaced is measured to determine the volume of the sample. The two values are then used to define the density.

Final Wasteform Analysis Using XRF

XRF-REO—Final Wasteform—This program is designed for Rare Earth based/containing materials and was used because of cerium content of the simulants. The analysis reported $Na_2O$, MgO, $Al_2O_3$, $SiO_2$, $P_2O_5$, $K_2O$, CaO, $TiO_2$, $Mn_3O_4$, $V_2O_5$, $Cr_2O_3$, $Fe_2O_3$, BaO, $ZrO_2$, ZnO, SrO and CeO in combination.

XRF-OXIDE—Final Wasteform—This program is designed for a variety of ceramic/oxide based materials and was used to analyse the clinoptilolite feed material.

Final Wasteform Analysis by ICP-OES

Hydrofluoric (HF) acid digestion of the solid waste samples was conducted under microwave radiation, due to the aggressive nature of the preparation technique and its ability to take the materials into solution. This procedure allowed a direct analysis of solidified melt products to be made. An aqua-regia digestion medium ($HCl/HNO_3$@3:1 w/w) was initially attempted but was found to be ineffective for taking silica into solution. Trace element analysis was carried out by inductively coupled plasma optical emission spectroscopy (ICP-OES). The samples were completely acid digested to all components and subsequently analysed by ICP-OES, to evaluate their compositions. Here, hydrofluoric acid was used to dissociate the silicate matrix and to dissolve the trace metal components. The resulting solution was passed into a plasma source in a flow of argon gas. Excitation of the elements present within the sample, and subsequent relaxation to their ground states, resulted in the emission of characterising elemental spectral lines. These were detected by a photometer, the intensity and wavelength of the emission being directly proportional to the concentration and identity respectively of the element in question.

Final Wasteform Analysis Using XRD

Inorganic phase identification of crystalline materials. X-ray diffraction measurements were obtained from solid specimens sectioned with a water-cooled diamond tipped cutting disc. The button specimens were sectioned radially to give two perpendicular surfaces, complementing the X-ray source/detector configuration. The samples were scanned across values of 2θ of X-X° with a step size of 0.02° in a continuous sweep. The important assumption was that the material was composed of an aggregate of tiny crystals in random orientations with respect to each other, even though the materials appeared homogeneous on a macroscopic scale. As the major constituents of the system were known, the types of phase formed could be predicted according to the ASTM index.

Facilities' Commercial Characteristics

The process design criteria developed for the trial were based on the simulated chemistry of the sludge waste materials, and the temperatures required for their effective thermal treatment, as defined by phase stability and liquidus temperatures data.

The advantages of the method of the present invention as exemplified above are as follows:

The gaseous environment and energy provided to the system can be controlled to give either oxidising or reducing conditions which offer some control over the volatility of radionuclide species to be engineered.

Fine particle feed capabilities: the plasma chamber and plasma arc configuration allow direct feeding of particulate material into the plasma chamber at the arc confluence (point of arc contact). This minimises entrainment and physical carry-over of the feed material to the exhaust gas stream and makes it ideal for the treatment of sludges with particle sizes in the order of microns.

The cold skull plasma chamber allows high temperatures and high energy fluxes during melt containment at elevated temperatures, i.e. above the liquidus temperature of the glasses, to be reached in a relatively short period of time. The term 'cold skull' means a water-cooled copper crucible. When in use, a solidified layer of waste-form glass forms at the internal surface of the crucible interface. This means that the crucible has minimal direct exposure to the inner working environment of the furnace and enhances the reliability, availability and maintainability (RAM) credentials of the facility.

Graphite electrodes offer the advantages of low cost and high reliability and the elimination of the secondary waste problems associated with directly water-cooled plasma devices. The electrodes are regarded as a consumable; that is continuously fed into the plasma chamber as an operational consumable. This also eliminates the hazards associated with plasma device water leaks and avoids equipment longevity issues due to chemical environment; e.g. the stress corrosion cracking of water-cooled torches.

The twin electrode configuration gives flexible operation. Two configurations can be employed; remotely coupled between two electrodes in free space, and directly coupled to a fluid melt. The latter allows ohmic heating of the melt, forming an additional heat dissipation mechanism within the plasma chamber. This configuration is the most suitable for heating a condensed phase due to its high current, low voltage characteristics and the direct passage of the plasma current through the material undergoing treatment. The remotely coupled configuration allows the plasma chamber to be started from cold, obviating the requirement for a conductive hearth, this also aids operation as is provides for easy recovery should solidification of the melt occur due to unexpected power outages.

The plasma chamber offers the combined advantages of being able to gasify the combustible parts of wastes and oxidise and vitrify the non-combustible parts. In principle, this allows simultaneous volume reduction with effective immobilisation of metals, thereby transforming the contaminated wastes into a safe, leach-resistant, final waste-form. Combustibles present within the wastes are thermally destroyed (cracked) to recombine downstream in the off-gas system as simpler, innocuous molecules.

Arc instabilities can be overcome during operation of the apparatus by using a pneumatically assisted, gravity feed, positive displacement metering pump mechanism that is completely sealed. This eliminates the unintentional ingress of diatomic atmospheric gases, which would otherwise cause some destabilisation of the plasma discharge.

The invention claimed is:

1. A method for treating nuclear sludge comprising subjecting the nuclear sludge to a plasma treatment in a plasma chamber, in the presence of an oxidant, to melt at least some of the inorganic components of the sludge, wherein the plasma chamber comprises a crucible having a cooled inner surface, this surface cooled sufficiently such that the inorganic components in contact with the inner surface are in a solid state and form a barrier between the part of surface of the crucible with which they are in contact and the molten inorganic components of the sludge;

wherein the plasma chamber comprises two graphite electrodes; and wherein the electrodes are operated in one or both of:

(i) a first mode in which an electric arc is passed between the electrodes above the level of the nuclear sludge (remotely coupled); or (ii) a second mode in which an electric arc is passed between the electrodes through the inorganic components of the sludge (transferred).

2. A method according to claim 1, wherein the plasma is generated by DC electricity.

3. A method according to claim 1, wherein the inner surface of the crucible comprises copper.

4. A method according to claim 1, wherein during the plasma treatment the internal surface of the crucible is maintained at a temperature below the solidus temperature of the inorganic components of sludge.

5. A method according to claim 4, wherein the inner surface of the crucible is at a temperature of 50° C. or below.

6. A method according to claim 1, wherein the crucible is water-cooled.

7. A method according to claim 1, wherein the method further comprising transferring the molten components of the sludge to a container for the storage of nuclear waste.

8. A method according to claim 1, wherein the sludge contains one or more materials selected from magnesium hydroxide, silicon dioxide, uranium oxide, magnesium carbonate, aluminium oxide, sodium oxide and magnesium oxide.

9. A method according to claim 1, wherein the method produces a solid product that contains one or more materials selected from forsterite, cordierite, albite and clinoptilolite and other zeolites.

10. A method according to claim 1, wherein the plasma treatment is carried out at a temperature of 1000° C. or more.

11. A method according to claim 1, wherein the plasma treatment is carried out at a temperature of 1800° C. or less.

12. A method according to claim 1, wherein the oxidant present within the plasma chamber comprises air.

13. A method according to claim 1, wherein gases selected from nitrogen, argon and air are fed to the plasma chamber.

14. A method according to claim 1, wherein the sludge is mechanically agitated during the plasma treatment.

15. A method according to claim 1, wherein at least one of the two graphite electrodes has a coating comprising alumina.

16. A method according claim 1, wherein the plasma chamber is further provided with:
   (i) a water-cooling system for cooling at least part of the inner surface of the crucible, wherein water can be passed between an outer wall and an inner wall of the crucible in order to cool the inner wall;
   (ii) an inlet for an oxidant adapted such that the oxidant and waste are mixed before or upon entry into the interior of the plasma chamber;
   (iii) an upper chamber and a lower chamber, the upper chamber being adapted to allow molten material in the upper chamber to flow by gravity into the lower chamber; and/or
   (iv) one or more electrodes having a coating comprising alumina.

* * * * *